US012771674B2

(12) United States Patent
Ihlar et al.

(10) Patent No.: US 12,771,674 B2
(45) Date of Patent: Oct. 20, 2026

(54) DUAL PROXY DEPLOYMENTS IN COMMUNICATIONS NETWORKS

(71) Applicant: Telefonaktiebolaget LM Ericsson (publ), Stockholm (SE)

(72) Inventors: Marcus Ihlar, Älvsjö (SE); Maria Luisa Mas Rosique, Tres Cantos (ES); Miguel Angel Muñoz De La Torre Alonso, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 109 days.

(21) Appl. No.: 18/874,921

(22) PCT Filed: Aug. 29, 2022

(86) PCT No.: PCT/EP2022/073916
§ 371 (c)(1),
(2) Date: Dec. 13, 2024

(87) PCT Pub. No.: WO2023/241819
PCT Pub. Date: Dec. 21, 2023

(65) Prior Publication Data
US 2026/0142946 A1 May 21, 2026

(30) Foreign Application Priority Data
Jun. 15, 2022 (EP) .................................... 22382571

(51) Int. Cl.
*H04L 9/40* (2022.01)

(52) U.S. Cl.
CPC ........ *H04L 63/0281* (2013.01); *H04L 63/029* (2013.01); *H04L 63/04* (2013.01)

(58) Field of Classification Search
CPC ... H04L 63/0281; H04L 63/029; H04L 63/04; H04L 67/51; H04L 67/141
(Continued)

(56) References Cited

U.S. PATENT DOCUMENTS 11,706,321 B2 * 7/2023 Huang .................. H04L 67/141 370/328
2007/0019623 A1 1/2007 Alt et al.
(Continued)

FOREIGN PATENT DOCUMENTS

CN 108337249 A 7/2018
EP 3886401 A1 * 9/2021 ............ H04L 67/60
(Continued)

OTHER PUBLICATIONS

International Search Report and Written Opinion dated Feb. 6, 2023 for International Application No. PCT/EP2022/073916 filed Aug. 29, 2022, consisting of 9 pages.
(Continued)

*Primary Examiner* — Glenford J Madamba
(74) *Attorney, Agent, or Firm* — Weisberg I.P. Law, P.A.

(57) ABSTRACT

Enabling dual-proxy relays in a communications network. The method includes transmitting from a second proxy node to a network exposure node a request for configuring a dual-proxy relay; transmitting from the network exposure node to a user data repository node at least one of an identifier and a network address information of the second proxy node; receiving at a policy control node from the user data repository node subscription data for the dual-proxy relay; transmitting from the policy control node to a session management node policy data for the dual-proxy relay; transmitting to a first proxy node user plane control data for the dual-proxy relay; determining that user plane traffic is traffic pertaining to the dual-proxy relay based on the received user plane control data; and transmitting from the first proxy node to the second proxy node the user plane traffic.

11 Claims, 10 Drawing Sheets

(58) Field of Classification Search
USPC .......................................................... 709/238
See application file for complete search history.

(56) References Cited

U.S. PATENT DOCUMENTS

2025/0184881 A1* 6/2025 Olvera-Hernandez ...................... H04L 67/51
2025/0323983 A1* 10/2025 De Foy ............... H04L 65/1108

FOREIGN PATENT DOCUMENTS

WO 03007574 A1 1/2003
WO WO-2021084326 A1 * 5/2021 ........ H04W 28/0273

OTHER PUBLICATIONS

3GPP TS 23.501 V17.3.0; 3rd Generation Partnership Project; Technical Specification Group Services and System Aspects; System architecture for the 5G System (5GS); Stage 2 (Release 17); Dec. 2021, consisting of 559 pages.
Schinazi D.; Internet Draft: Google LLC; UDP Proxying Support for HTTP; Masque; Intended Status: Standard Track; Oct. 25, 2021, consisting of 12 pages.

* cited by examiner

DUAL PROXY DEPLOYMENTS IN COMMUNICATIONS NETWORKS

CROSS-REFERENCE TO RELATED APPLICATIONS

This application is a Submission Under 35 U.S.C. § 371 for U.S. National Stage Patent Application of International Application No.: PCT/EP2022/073916, filed Aug. 29, 2022 entitled "DUAL PROXY DEPLOYMENTS IN COMMUNICATIONS NETWORKS," which claims priority to European Application No.: EP22382571.2, filed Jun. 15, 2022, the entireties of both of which are incorporated herein by reference.

TECHNICAL FIELD

The present invention generally relates to dual-proxy deployments, also known as private relay networks, and more specifically, the invention relates to the integration of dual-proxy deployments or private relay networks into mobile or communications networks.

BACKGROUND

Traffic encryption is growing significantly and at the same time, the encryption mechanisms are growing in complexity. Most applications today are based on HTTPS (using TLS). Additionally, a significant part of the traffic is based on QUIC transport, which has an encryption level higher than TLS.

A private relay network is a new internet privacy service that allows users to connect to and browse the web in a more secure and private way. It ensures all traffic leaving a user's device is encrypted, so no one between the user and the website they are visiting can access and read it, not even the mobile device or the user's network provider. The user's traffic is sent through two separate internet relays. The first assigns the user an anonymous IP address that maps to their region but not their actual location. The second decrypts the web address they want to visit and forwards them to their destination. This separation of information protects the user's privacy because no entity inspecting the traffic can identify the user or classify the traffic.

Private relay networks work with two QUIC/MASQUE proxies (acting as relays), as depicted in FIG. 2. The ingress proxy assigns the user an anonymous IP address (maps to their region but not their actual location). The egress proxy decrypts the web address they want to visit and forwards them to their destination. Private relays may be MASQUE based dual-proxy deployments.

QUIC is a UDP (User Datagram Protocol) based stream-multiplexed and secure transport protocol with integrity protected header and encrypted payload. Unlike the traditional transport protocol stack with TCP (Transmission Control Protocol), which resides in the operating system kernel, QUIC can easily be implemented in user space, i.e., in the application layer. Therefore, this improves flexibility in terms of transport protocol evolution with implementation of new features, congestion control, deploy ability and adoption. Encryption in QUIC covers both the transport protocol headers as well as the payload, as opposed to TLS over TCP, e.g., HTTPS, protecting only the payload.

A proxy is an intermediary entity acting as both server and client, creating or simply relaying requests on behalf of other entities. Requests are serviced internally or by passing them on, with possible translation, to other servers. A "transparent proxy" is a proxy that does not modify the request or response beyond what is required for proxy authentication and identification. A "non-transparent proxy" is a proxy that modifies the request or response to provide some added service to the user agent, such as group annotation services, media type transformation, protocol reduction, or anonymity filtering. A "reverse proxy" basically is a proxy that pretends to be the actual server (as far as any client or client proxy is concerned), but it passes on the request to the actual server that is usually sitting behind another layer of firewalls. A "Performance Enhancement Proxy (PEP)" is used to improve the performance of protocols on network paths where native performance suffers due to characteristics of a link or subnetwork on the path.

IETF has created the MASQUE working group, aimed to develop mechanisms that allow configuring and concurrently running multiple proxied stream- and datagram-based flows inside an HTTPS connection. These mechanisms are known as MASQUE. HTTP and/or HTTP/3 extensions of the CONNECT method are specified to enable this functionality, e.g., CONNECT-UDP for UDP proxying, or connect-udp protocol header.

A Collaborative Performance Enhancement (COPE) node or function is an entity which resides between two endpoints, usually in a client and server setup but also in a peer-to-peer communication setup, that use encrypted communication. The communicating parties (usually the client) explicitly contact the proxy to request a network-support service. This service based on MASQUE at a minimum always includes forwarding of the encrypted traffic to a specific server, e.g., also in cases where the server is otherwise not directly reachable. In addition, the endpoints can share traffic information with the COPE entity such that the COPE entity can execute a requested performance enhancement function to improve the QoS of the traffic as well as optimize operations within the network. Alternatively, also the COPE node can provide additional information about the network which enables the endpoint to optimize its data transfer, e.g., use a more optimized congestion control or delay pre-fetching activities.

A client learns about the existence of a COPE service either directly from the access network or by other communication with a peer. When a COPE node is detected, the client can open a connection to it and request a service using MASQUE. The communication with the server is realized by an inner transport connection that is encrypted end-to-end between the client and the server. By using these mechanisms, the application creates a secure connection to an on-path network proxy, a secure E2E connection to the server(s) is stablished via the proxy, application data is secured E2E and protected from unauthorized used in the network, and content provider and Mobile Network Operator has a secure channel to exchange information about application and policy real-time.

As depicted in FIG. 4, any MASQUE-based interaction starts with the application client explicitly opening a QUIC tunnel connection to the proxy and requesting forwarding. The MASQUE/QUIC proxy provides secure forwarding but can also offer COPE services, e.g., congestion control support (mobile/satellite), access policy enforcement, load balancing/mobility, multi-hop chaining/onion routing. QUIC proxy may optionally also open a tunnel to server (if supported by server). FIG. 4 shows an inner connection which carries (encrypted) application traffic between client and server (not visible to the proxy), while the outer connection can be used to expose information between the Content Provider (Application Client and/or Server) and the Mobile Network Operator (e.g., QUIC Proxy at UPF).

A problematic aspect is that mobile network operators today require application/service awareness to apply differentiated traffic management actions, e.g., Charging, QoS, etc. Differentiated traffic management in mobile or communications networks is now challenged due to private relay networks, a dual-proxy solution based on MASQUE technology (MASQUE based Dual-proxy deployments).

Dual-proxy deployments or private relay networks protect the user's privacy because no entity inspecting the traffic can identify the user or its traffic. Therefore, the MNO cannot apply differentiated traffic management actions and reporting (as it is done for traffic that is not subject to dual proxy deployments) and can't apply different policies and charging depending on the service/application.

SUMMARY

An object of the invention is to enable dual-proxy relays in a communications network, particularly when a first proxy or ingress proxy of the dual-proxy deployment is hosted by the communications network.

A first aspect of the invention relates to a method performed by a first proxy node for enabling dual-proxy relays in a communications network. The method comprises receiving at a first proxy node from a session management node user plane control data for a dual-proxy relay including the at least one of an identifier of the second proxy node and a network address information of the second proxy node; determining at the first proxy node that user plane traffic is traffic pertaining to the dual-proxy relay based on the received user plane control data; and transmitting from the first proxy node to the second proxy node the user plane traffic. In some embodiments, the method further comprises transmitting from the first proxy node to the session management node an indication of the support of the capability of acting as a proxy in dual-proxy relay deployments. In some embodiments, the method further comprises transmitting from the first proxy node towards the UE, network address information of the first proxy node. In some embodiments, the network address information of the first proxy node is transmitted via the session management node, particularly wherein the network address information of the first proxy node is further transmitted via Extended Protocol Configuration Options (ePCO). In some embodiments, determining that the user plane traffic is traffic pertaining to the dual-proxy relay comprises determining that a connection has been established between the first proxy node and the UE. In some embodiments, the connection is a MASQUE connection. In some embodiments, the user plane control data further includes a dual-proxy profile identifier, and wherein the first proxy node transmits the dual-proxy profile identifier to the second proxy node included in the user plane data. In some embodiments, the user plane control data further includes an indication to enable the dual-proxy relay, and wherein the first proxy node activates the dual-proxy relay functionality based on the indication. In some embodiments, the user plane control data further includes at least one of an allowed policy for the dual-proxy relay and/or a policy rule for the dual-proxy relay, and wherein the first proxy node performs the corresponding policy actions based on the at least one allowed policy and/or the policy rule. In some embodiments, the first proxy node and second proxy node are MASQUE proxy nodes. In some embodiments, the first proxy node is a User Plane Function (UPF), or a combination of a UPF and a proxy service function; the second proxy node is an Application Function (AF), and the session management node is a Session Management Function (SMF).

A second aspect of the invention relates to a method performed by a second proxy node for enabling dual-proxy relays in a communications network. The method comprises transmitting from a second proxy node to a network exposure node a request for configuring a dual-proxy relay including at least one of an identifier of the second proxy node and a network address information of the second proxy node; and receiving at the second proxy node from a first proxy node user plane traffic pertaining to the dual-proxy relay including the least one of an identifier of the second proxy node and a network address information of the second proxy node. In some embodiments, the request for configuring the dual-proxy relay further includes a dual-proxy profile identifier, and wherein the second proxy node receives the dual-proxy profile identifier from the first proxy node included in the user plane traffic. In some embodiments, the request for configuring the dual-proxy relay further includes an indication to enable the dual-proxy relay, and wherein the second proxy node receives the user plane traffic after the enabling of the dual-proxy relay. In some embodiments, the request for configuring the dual-proxy relay further includes at least one of an allowed policy for the dual-proxy relay and/or a policy rule for the dual-proxy relay, and wherein the second proxy node receives the user plane traffic according to the at least one allowed policy and/or the policy rule. In some embodiments, the first proxy node and second proxy node are MASQUE proxy nodes. In some embodiments, the first proxy node is a User Plane Function (UPF), or a combination of a UPF and a proxy service function; the second proxy node is an Application Function (AF), and the network exposure node is a Network Exposure Function (NEF).

A third aspect of the invention relates to a method performed by a network exposure node for enabling dual-proxy relays in a communications network. The method comprises receiving at a network exposure node from a second proxy node a request for configuring a dual-proxy relay including at least one of an identifier of the second proxy node and a network address information of the second proxy node; transmitting from the network exposure node to a user data repository node the at least one of an identifier of the second proxy node and a network address information of the second proxy node; receiving at the network exposure node from the user data repository node information pertaining to the dual-proxy relay configuration, particularly wherein the information includes at least one of an indication of success or an indication of failure; and transmitting from the network exposure node to the second proxy node the information pertaining to the dual-proxy relay configuration. In some embodiments, the information pertaining to the dual-proxy relay configuration further includes a dual-proxy profile identifier. In some embodiments, the request for configuring the dual-proxy relay further includes an indication to enable the dual-proxy relay. In some embodiments, the request for configuring the dual-proxy relay further includes at least one of an allowed policy for the dual-proxy relay and/or a policy rule for the dual-proxy relay. In some embodiments, the second proxy node is a MASQUE proxy node. In some embodiments, the second proxy node is an Application Function (AF), the network exposure node is a Network Exposure Function (NEF) and the user data repository node is a User Data Repository (UDR).

Other aspects of the invention relate to mobile network nodes, particularly a first proxy node, a session management node, a network exposure node, a policy control node, a second proxy node, and a user data repository node configured to perform the respective methods as described herein. Other aspects of the invention relate to computer program and computer program products.

In some embodiments, the first proxy node is a User Plane Function (UPF). In some embodiments, the session management node is a Session Management Function (SMF). In some embodiments, the network exposure node is a Network Exposure Function (NEF). In some embodiments, the policy control node is a Policy Control Function (PCF). In some embodiments, the second proxy node is an Application Function (AF). In some embodiments, the user data repository node is a User Data Repository (UDR).

Advantageously, the solution disclosed herein enables the communications network operator to apply differentiated traffic management actions, policies and reporting over a dual-proxy deployment Further advantageously, the solution disclosed herein enables preserving the user privacy due to the effect of the dual-proxy relay deployment.

Additional objectives, features and advantages of the concepts disclosed herein will be apparent from the following description, claims and drawings, or may be learned by practice of the described technologies and concepts as set forth herein.

BRIEF DESCRIPTION OF THE DRAWINGS

In order to best describe the manner in which the disclosed concepts may be implemented, as well as define other objects, advantages and features of the disclosure, a more particular description is provided below and is illustrated in the appended drawings. Understanding that these drawings depict only exemplary embodiments of the invention and are not therefore to be considered to be limiting in scope, the examples will be described and explained with additional specificity and detail through the use of the accompanying drawings.

DETAILED DESCRIPTION

The invention will now be described in detail hereinafter with reference to the accompanying drawings, in which examples of embodiments or implementations of the invention are shown. The invention may, however, be embodied or implemented in many different forms and should not be construed as limited to the embodiments set forth herein. Rather, these embodiments are provided so that this disclosure will be thorough and complete, and will fully convey the scope of present invention to those skilled in the art. It should also be noted that these embodiments are not mutually exclusive. Components from one embodiment may be tacitly assumed to be present/used in another embodiment. These embodiments of the disclosed subject matter are presented as teaching examples and are not to be construed as limiting the scope of the disclosed subject matter. For example, certain details of the described embodiments may be modified, omitted, or expanded upon without departing from the scope of the described subject matter.

Figure 1:
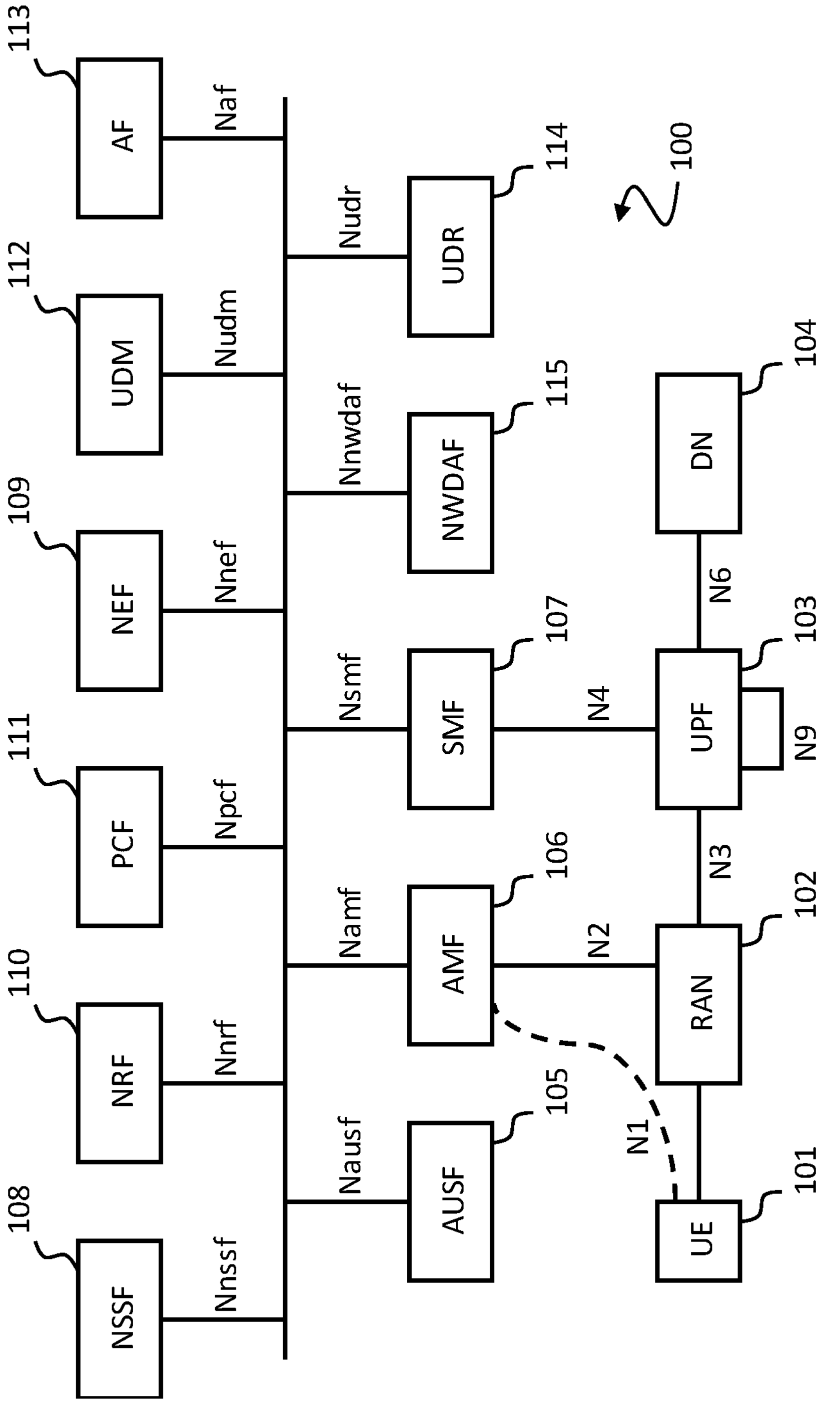
FIG. 1 illustrates an example networked system in accordance with particular embodiments of the solution described herein.
Figure 2:
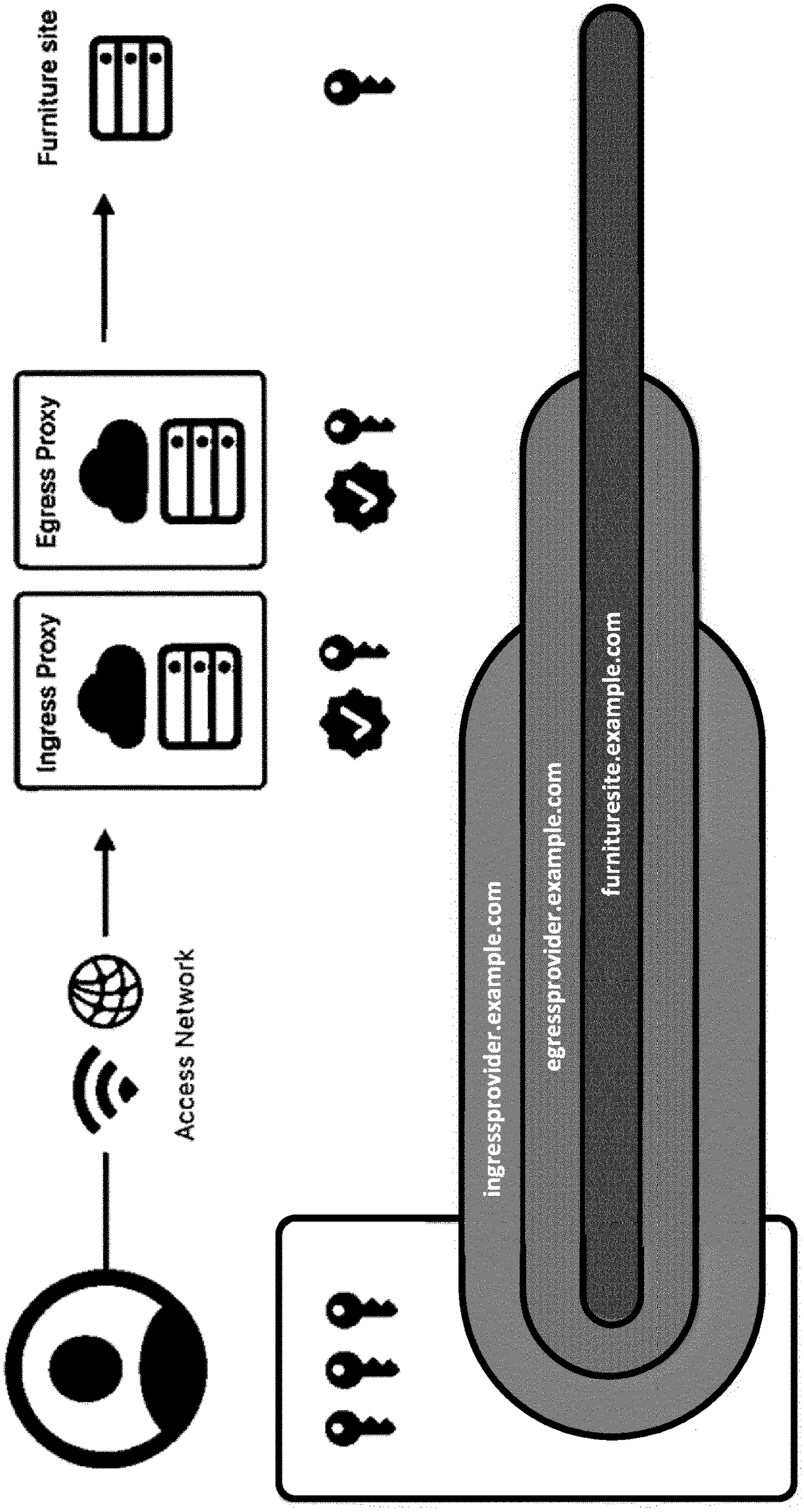
FIG. 2 illustrates an example block diagram showing network entities in a mobile communications network according to particular embodiments of the solution described herein.
Figure 3A:
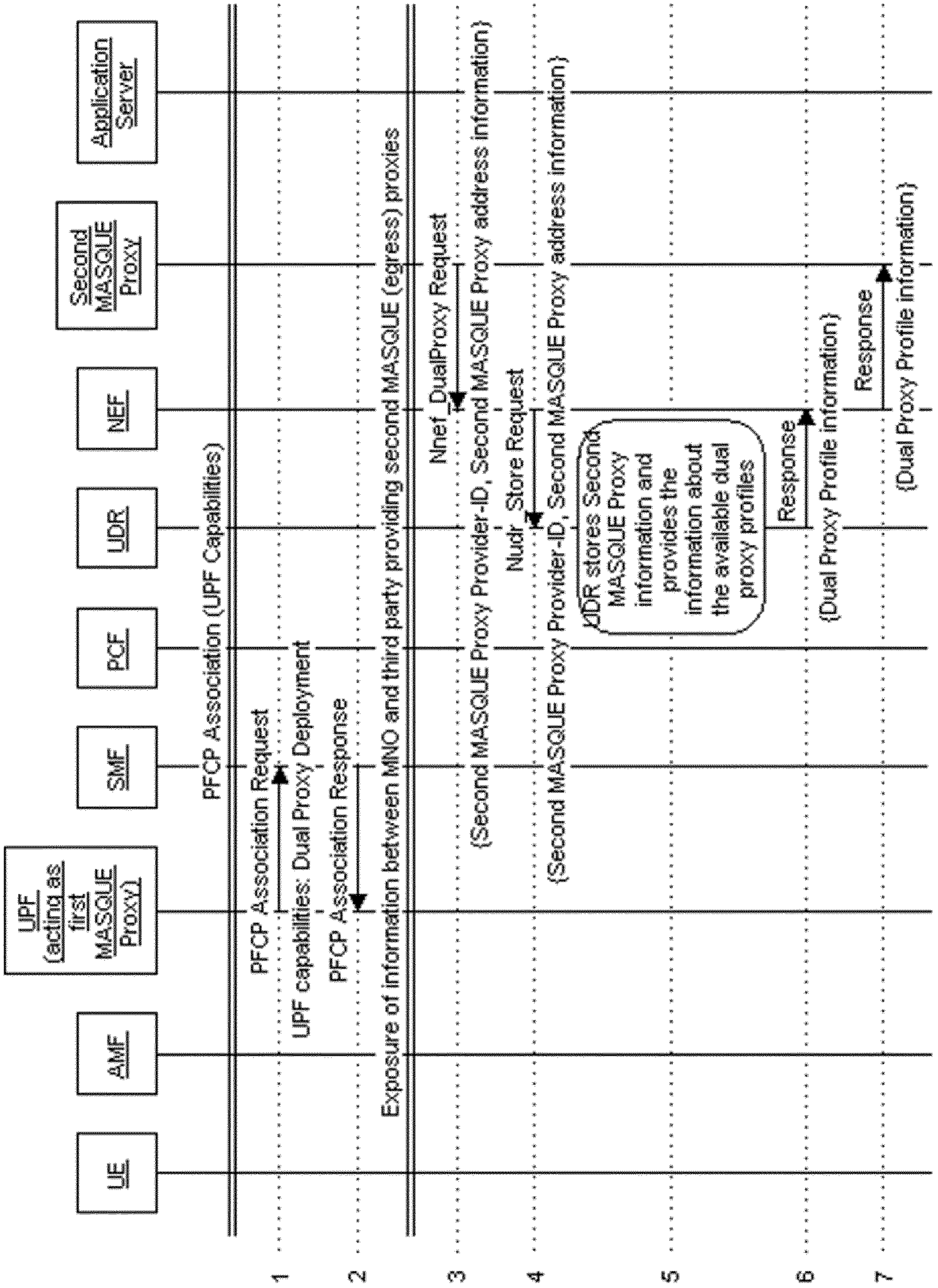
FIGS. 3A-3E illustrate an example signaling diagram showing a procedure according to particular embodiments of the solution described herein.
Figure 3B:
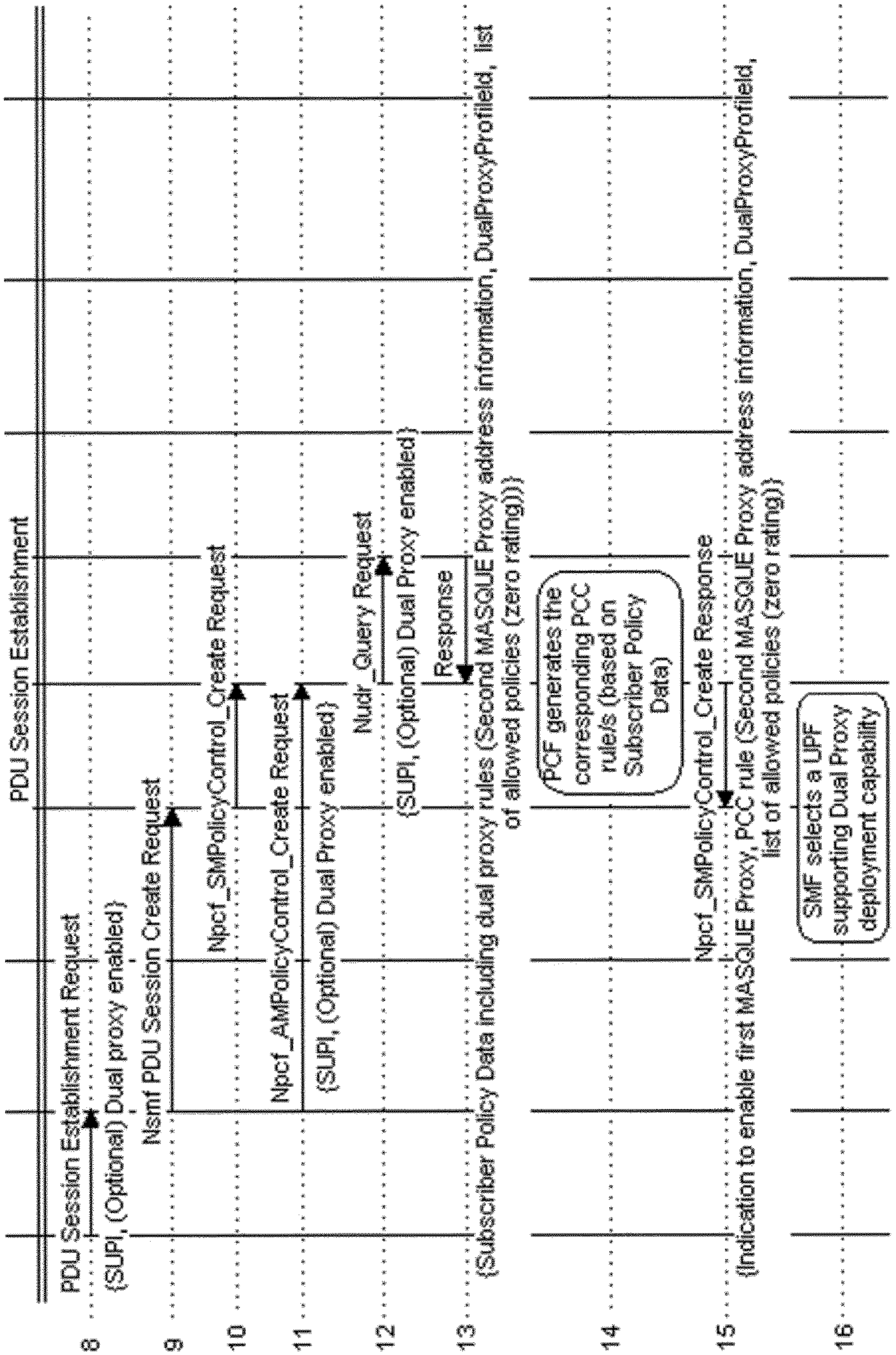
Figure 3C:
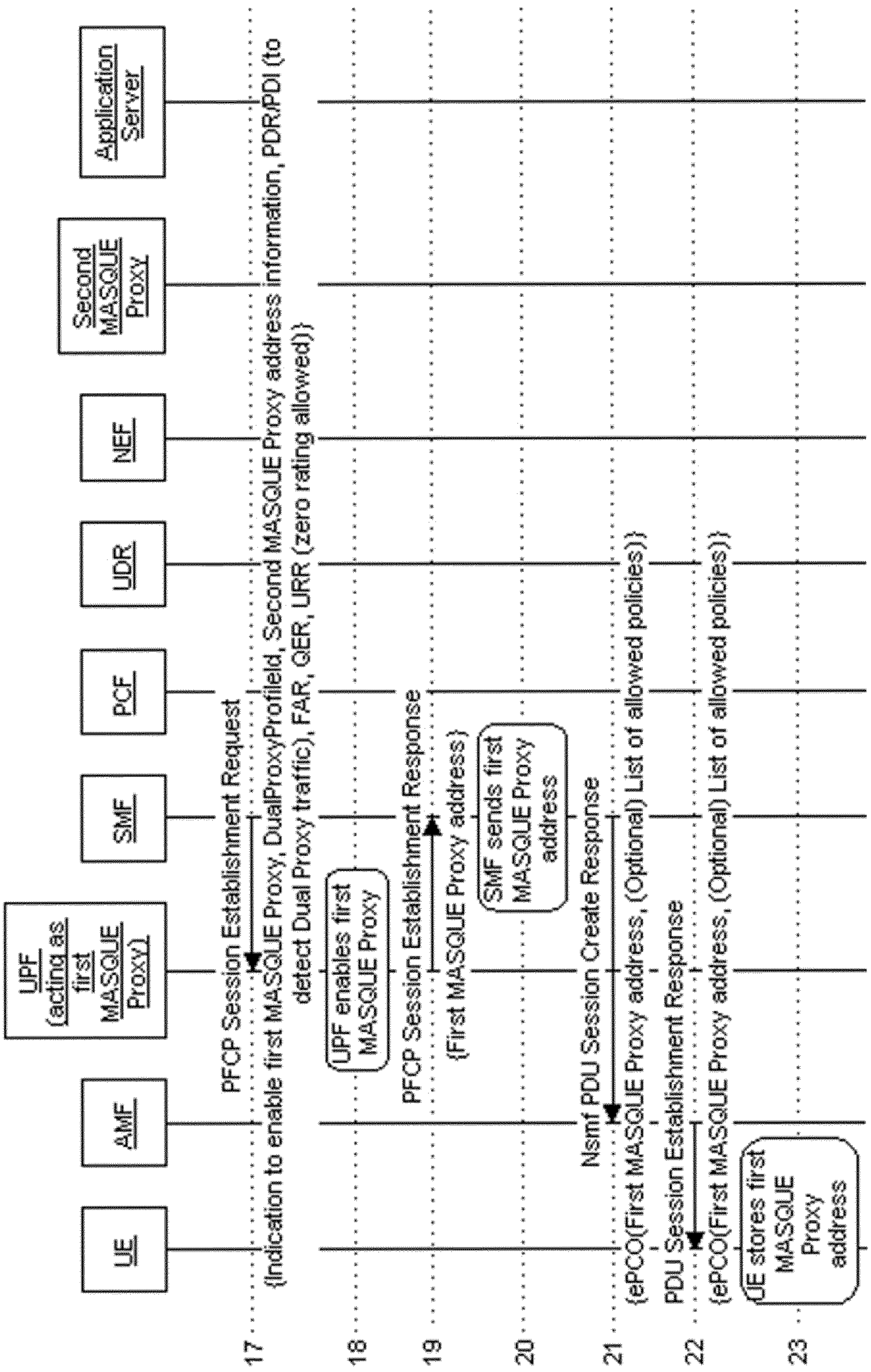
Figure 3D:
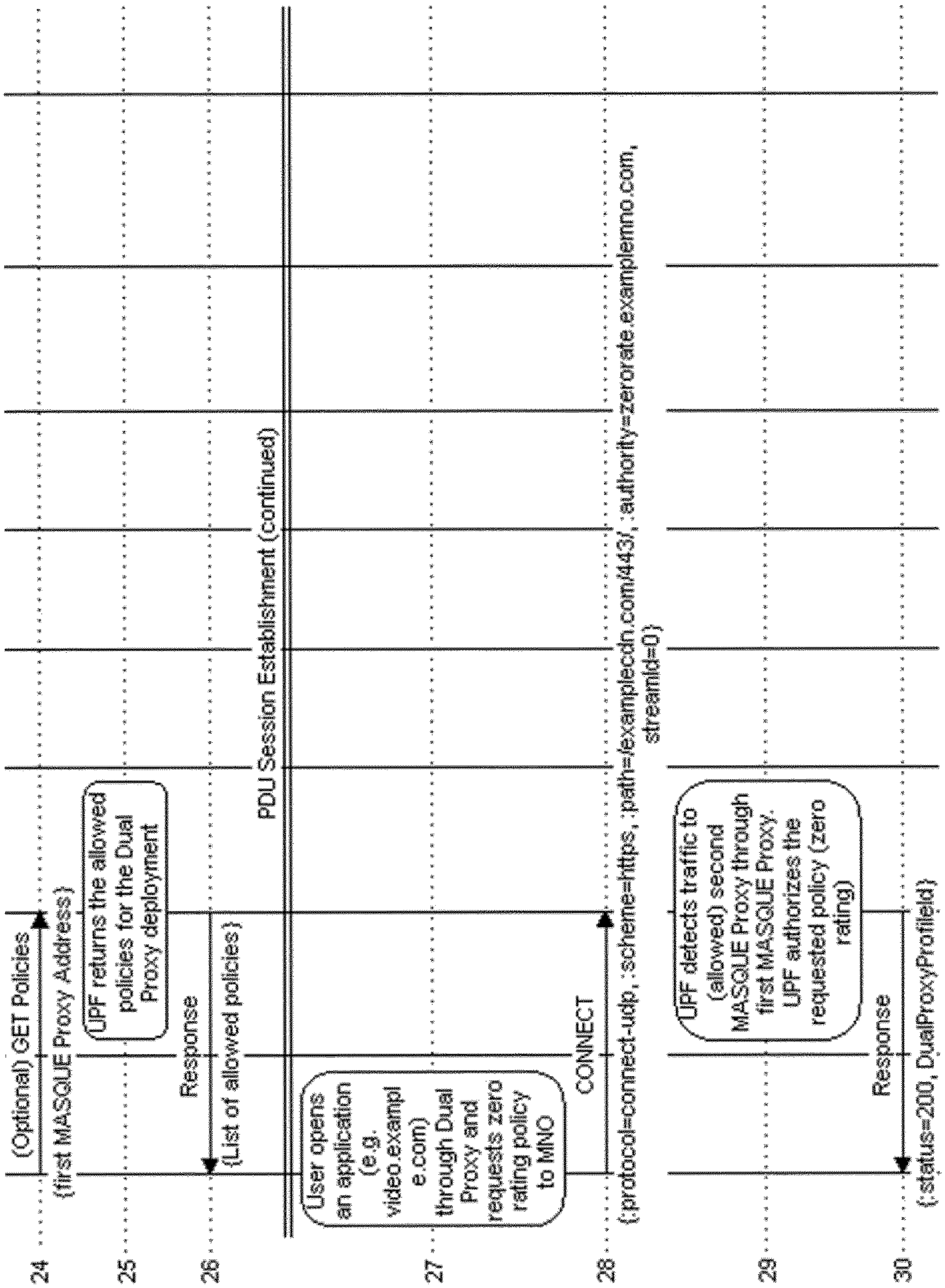
Figure 3E:
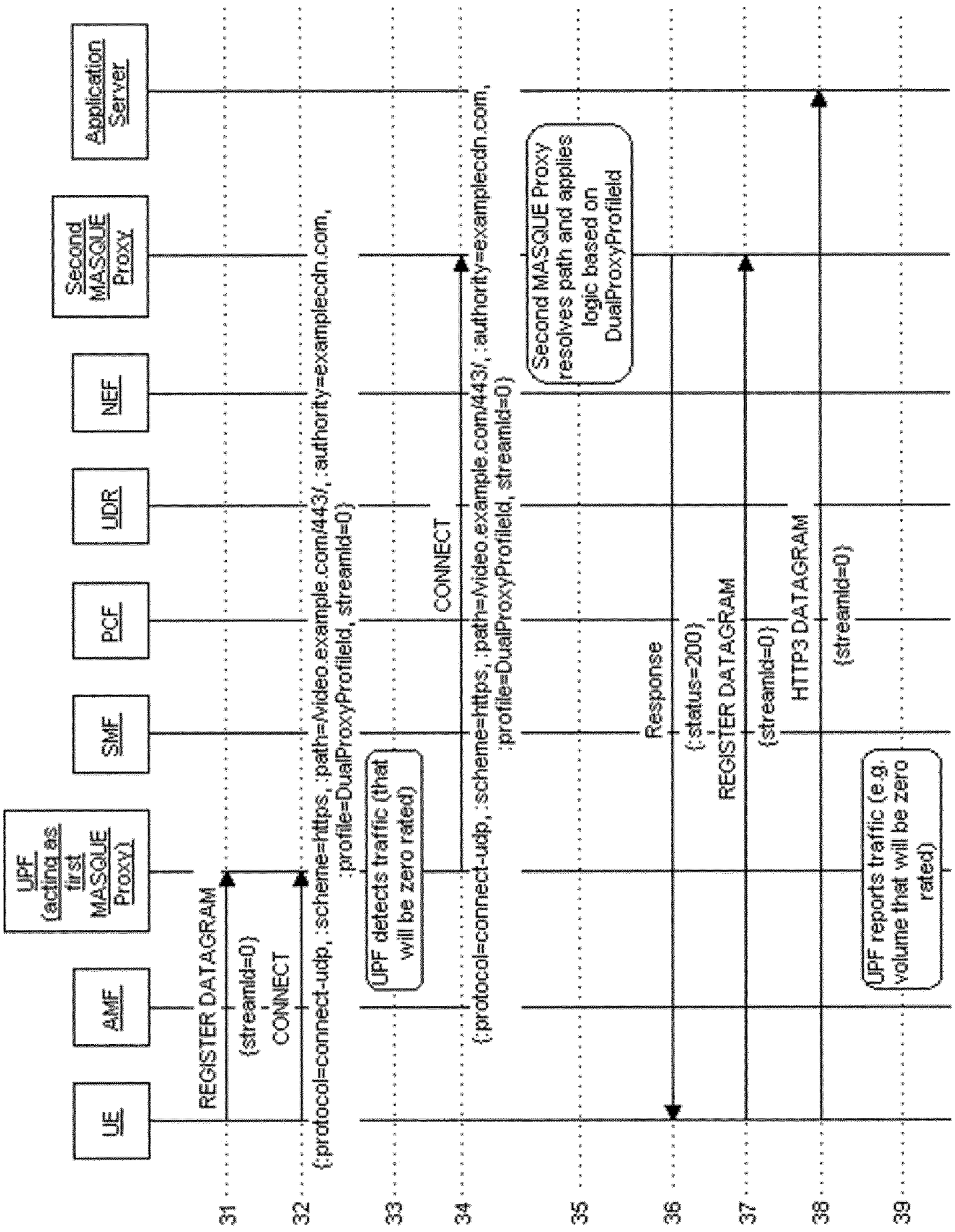

The example embodiments described herein arise in the context of a telecommunications network, including but not limited to a telecommunications network that conforms to and/or otherwise incorporates aspects of a fifth generation (5G) architecture. FIG. 1 is an example networked system 100 in accordance with example embodiments of the present disclosure. FIG. 1 specifically illustrates User Equipment (UE) 101, which may be in communication with a (Radio) Access Network (RAN) 102 and Access and Mobility Management Function (AMF) 106 and User Plane Function (UPF) 103. The AMF 106 may, in turn, be in communication with core network services including Session Management Function (SMF) 107 and Policy Control Function (PCF) 111. The core network services may also be in communication with an Application Server/Application Function (AS/AF) 113. Other networked services also include Network Slice Selection Function (NSSF) 108, Authentication Server Function (AUSF) 105, User Data Management (UDM) 112, Network Exposure Function (NEF) 109, Network Repository Function (NRF) 110 and Data Network (DN) 104. In some example implementations of embodiments of the present disclosure, each one of the entities in the networked system 100 are considered to be a Network Function (NF). One or more additional instances of the NFs may be incorporated into the networked system.

The solution described herein aims to enable dual-proxy relays in a communications network, particularly when a first proxy or ingress proxy of the dual-proxy deployment is hosted by the communications network.

This disclosure provides a method for enabling dual-proxy relays in a communications network. The method comprises transmitting from a second proxy node to a network exposure node a request for configuring a dual-proxy relay including at least one of an identifier of the second proxy node and a network address information of the second proxy node; transmitting from the network exposure node to a user data repository node the at least one of an identifier of the second proxy node and a network address information of the second proxy node; receiving at a policy control node from the user data repository node subscription data for the dual-proxy relay including the at least one of an identifier of the second proxy node and a network address information of the second proxy node; transmitting from the policy control node to a session management node policy data for the dual-proxy relay including the at least one of an identifier of the second proxy node and a network address information of the second proxy node; transmitting from the session management node to a first proxy node user plane control data for the dual-proxy relay including the at least one of an identifier of the second proxy node and a network address information of the second proxy node; determining at the first proxy node that user plane traffic is traffic pertaining to the dual-proxy relay based on the received user plane control data; and transmitting from the first proxy node to the second proxy node the user plane traffic. In some embodiments, the method further comprises transmitting from the first proxy node to the session management node an indication of the support of the capability of acting as a proxy in dual-proxy relay deployments; and selecting at the session management node the first proxy node based on the transmitted indication. In some embodiments, the method further comprises receiving at the policy control node an indication originated in a User Equipment (UE) that the UE is dual-proxy enabled; and initiating at the policy control node the retrieval of the subscription data for the dual-proxy relay for the UE. In some embodiments, the method further comprises transmitting from the first proxy node towards the UE, network address information of the first proxy node. In some embodiments, the network address information of the first proxy node is transmitted via the session management node, particularly wherein the network address information of the first proxy node is further transmitted via Extended Protocol Configuration Options (ePCO). In some embodiments, determining that the user plane traffic is traffic pertaining to the dual-proxy relay comprises determining that a connection has been established between the first proxy node and the UE. In some embodiments, the connection is a MASQUE connection. In some embodiments, the subscription data, the policy data, and/or the user plane control data further include a dual-proxy profile identifier, and wherein the first proxy node transmits the dual-proxy profile identifier to the second proxy node included in the user plane traffic. In some embodiments, the subscription data, the policy data, and/or the user plane control data further include an indication to enable the dual-proxy relay, and wherein the first proxy node activates the dual-proxy relay functionality based on the indication. In some embodiments, the subscription data, the policy data, and/or the user plane control data further include at least one of an allowed policy for the dual-proxy relay and/or a policy rule for the dual-proxy relay, and wherein the first proxy node performs the corresponding policy actions based on the at least one allowed policy and/or the policy rule. In some embodiments, the first proxy node and second proxy node are MASQUE proxy nodes. In some embodiments, the first proxy node is a User Plane Function (UPF), or a combination of a UPF and a proxy service function; the second proxy node is an Application Function (AF), the session management node is a Session Management Function (SMF), the policy control node is a Policy Control Function (PCF), the network exposure node is a Network Exposure Function (NEF) and the user data repository node is a User Data Repository (UDR).

This disclosure also provides mobile network nodes, particularly a first proxy node (103, 800), a session management node (107), a network exposure node (109, 1000), a policy control node (111), configured to perform the respective methods as described herein. In some embodiments, the first proxy node is a User Plane Function (UPF) 103. In some embodiments, the session management node is a Session Management Function (SMF) 107. In some embodiments, the network exposure node is a Network Exposure Function (NEF) 109. In some embodiments, the policy control node is a Policy Control Function (PCF) 111. In some embodiments, the second proxy node is an Application Function (AF) 113. In some embodiments, the user data repository node is a User Data Repository (UDR) 114.

This disclosure also provides the corresponding computer program and computer program products comprising code, for example in the form of a computer program, that when run on processing circuitry of the mobile network nodes causes the mobile network nodes to perform the disclosed methods.

Advantageously, the solution disclosed herein enables the communications network operator to apply differentiated traffic management actions, policies and reporting over a dual-proxy deployment Further advantageously, the solution disclosed herein enables preserving the user privacy due to the effect of the dual-proxy relay deployment.

The solution and the features comprised therein are further described in what follows.

This disclosure describes a collaborative solution based on hosting a MASQUE Proxy at MNO (UPF), acting as the first MASQUE Proxy in MASQUE based dual-proxy deployments.

The solution allows the network operator to apply differentiated traffic management actions and reporting based on UPF hosting a MASQUE Proxy, acting as the first MASQUE Proxy in dual-proxy deployments.

The solution comprises the following aspects.

There may be an SLA agreement between the different parties involved in the dual-proxy deployment (e.g., Private Relay): UE OS vendor, MNO providing the first MASQUE proxy in this dual-proxy deployment and a third party (e.g., a CDN provider) providing the second MASQUE proxy in this dual-proxy deployment.

At the operator's network, a new feature "Traffic Management for dual-proxy deployments" may be enabled/disabled on a per subscriber, on a per group of subscribers, on a per global (network) basis or on a per DNN basis. Additionally, this feature can also be enabled on a per application basis (e.g., for a certain application or for a set applications). This feature allows MNO to apply Traffic Management actions and reporting to traffic on dual-proxy deployments (and thus encrypted and preserving user privacy).

In the PFCP Association procedure, UPF may report to SMF a new capability (UPF acting as first MASQUE proxy for dual-proxy deployments). This allows SMF to select a UPF supporting this capability on a per PFCP session basis.

A third party (e.g., a CDN provider) providing the second MASQUE Proxy in this dual-proxy deployment may optionally provision the second MASQUE proxy related information to MNO (e.g., by sending the IP addresses of the CDN servers). Alternatively, the second MASQUE proxy related information might be locally provisioned by MNO (based on the SLA agreement between MNO and third party (e.g., CDN provider).

The MNO may expose to the third party providing second MASQUE Proxy in this dual-proxy deployment, information about the available dual proxy profiles to allow subscription aware handling at the second MASQUE Proxy.

At PDU Session Establishment/Modification the following aspects may take place.

The UE may indicate that dual proxy is enabled for the session.

The MNO may activate dual-proxy deployment related policies:

The UDR may store (e.g., on a per global or on a per subscriber basis) the allowed policies (e.g., zero rating) and the dual proxy profiles related to dual-proxy deployments.

The PCF may retrieve from UDR (and may convey to SMF) subscriber policy data including dual-proxy deployment rules, specifically:

The second MASQUE Proxy address information. This contains the addresses of the allowed second MASQUE Proxies (the CDN proxies, for example).

Allowed policies (e.g., zero rating).

Dual proxy profile identifier.

The SMF may retrieve from PCF (and may convey to UPF) the above dual-proxy deployment rules.

The UPF may apply the following:

Retrieve from the SMF the above dual-proxy deployment rules. These rules are stored (and not activated) in the UPF.

Enable MNO acting as the first MASQUE proxy for dual-proxy deployment.

Convey MNO first MASQUE Proxy address information to UE (e.g., through SMF and NAS signaling).

During the PDU session the following aspects may take place.

The user opens an application.

The user requests a certain policy (e.g., zero rating) for the application to the MNO.

The application traffic is sent over the dual-proxy deployment.

The UPF may apply the following:

Detect traffic to (allowed) second MASQUE Proxy through MNO first MASQUE Proxy.

Authorize the requested policy (e.g., zero rating) based on the dual-proxy deployment rules previously stored.

Convey the dual proxy profile identifier to the second MASQUE Proxy.

Report detected traffic (e.g., volume reporting to SMF) that will be zero rated by MNO.

Hereinafter, drawings showing examples of embodiments of the solution are described in detail.

FIG. 3A-3E is a signaling diagram illustrating a procedure for enabling dual-proxy relays in a communications network. The procedure is performed by a first proxy node (103, 800), a session management node (107), a network exposure node (109, 1000), a policy control node (111), configured to perform the respective methods as described herein. In some embodiments, the first proxy node is a User Plane Function (UPF) 103. In some embodiments, the session management node is a Session Management Function (SMF) 107. In some embodiments, the network exposure node is a Network Exposure Function (NEF) 109. In some embodiments, the policy control node is a Policy Control Function (PCF) 111. In some embodiments, the second proxy node is an Application Function (AF) 113. In some embodiments, the user data repository node is a User Data Repository (UDR) 114.

There may be an SLA agreement between the different parties involved in the dual-proxy deployment (e.g., Private Relay): UE OS vendor, MNO providing the first MASQUE proxy in this dual-proxy deployment and a third party (e.g. a CDN provider) providing the second MASQUE proxy in this dual-proxy deployment. Further, at the operator's network, a new feature "Traffic Management for dual-proxy deployment" may be enabled on a per subscriber basis.

The steps in the figure are described in the following.

In steps 1 and 2, at PFCP Association procedure between UPF and SMF entities, it is proposed to extend the existing mechanism to report UPF capabilities with a new capability (the UPF acting as first MASQUE proxy for dual-proxy deployment: DPD, see table below). This allows the SMF to know which UPFs support this capability and thus can influence on UPF selection.

TABLE 1

UP Function Features including DPD

| Feature Octet/ Bit | Feature | Interface | Description |
|---|---|---|---|
| 5/1 | BUCP | Sxa, N4 | Downlink Data Buffering in CP function is supported by the UP function. |
| 5/2 | DDND | Sxa, N4 | The buffering parameter 'Downlink Data Notification Delay' is supported by the UP function. |
| 5/3 | DLBD | Sxa, N4 | The buffering parameter 'DL Buffering Duration' is supported by the UP function. |
| 5/4 | TRST | Sxb, Sxc, N4 | Traffic Steering is supported by the UP function. |
| 5/5 | FTUP | Sxa, Sxb, N4 | F-TEID allocation/release in the UP function is supported by the UP function. |
| 5/6 | PFDM | Sxb, Sxc, N4 | The PFD Management procedure is supported by the UP function. |

TABLE 1-continued

UP Function Features including DPD

| Feature Octet/ Bit | Feature | Interface | Description |
|---|---|---|---|
| 5/7 | HEEU | Sxb, Sxc, N4 | Header Enrichment of Uplink traffic is supported by the UP function. |
| 5/8 | TREU | Sxb, Sxc, N4 | Traffic Redirection Enforcement in the UP function is supported by the UP function. |
| 6/1 | EMPU | Sxa, Sxb, N4 | Sending of End Marker packets supported by the UP function. |
| 6/2 | PDIU | Sxa, Sxb, Sxc, N4 | Support of PDI optimised signalling in UP function (see clause 5.2.1A.2). |
| 6/3 | UDBC | Sxb, Sxc, N4 | Support of UL/DL Buffering Control |
| 6/4 | QUOAC | Sxb, Sxc, N4 | The UP function supports being provisioned with the Quota Action to apply when reaching quotas. |
| 6/5 | TRACE | Sxa, Sxb, Sxc, N4 | The UP function supports Trace (see clause 5.15). |
| 6/6 | FRRT | Sxb, N4 | The UP function supports Framed Routing (see IETF RFC 2865 [37] and IETF RFC 3162 [38]). |
| 6/7 | PFDE | Sxb, N4 | The UP function supports a PFD Contents including a property with multiple values. |
| 6/8 | EPFAR | Sxa, Sxb, Sxc, N4 | The UP function supports the Enhanced PFCP Association Release feature (see clause 5.18). |
| 7/1 | DPDRA | Sxb, Sxc, N4 | The UP function supports Deferred PDR Activation or Deactivation. |
| 7/2 | ADPDP | Sxa, Sxb, Sxc, N4 | The UP function supports the Activation and Deactivation of Pre-defined PDRs (see clause 5.19). |
| 7/3 | UEIP | Sxb, N4 | The UP function supports allocating UE IP addresses or prefixes (see clause 5.21). |
| 7/4 | SSET | N4 | UPF support of PFCP sessions successively controlled by different SMFs of a same SMF Set (see clause 5.22). |
| 7/5 | MNOP | Sxa, Sxb, Sxc, N4 | UPF supports measurement of number of packets which is instructed with the flag 'Measurement of Number of Packets' in a URR. See also 5.2.2.2.1. |
| 7/6 | MTE | N4 | UPF supports multiple instances of Traffic Endpoint IDs in a PDI. |
| 7/7 | BUNDL | Sxa, Sxb, Sxc, N4 | PFCP messages bunding (see clause 6.5) is supported by the UP function. |
| 7/8 | GCOM | N4 | UPF support of 5G VN Group Communication. (See clause 5.23) |
| 8/1 | MPAS | N4 | UPF support for multiple PFCP associations to the SMFs in an SMF set (see clause 5.22.3). |
| 8/2 | RTTL | N4 | The UP function supports redundant transmission at transport layer. |
| 8/3 | VTIME | Sxb, N4 | UPF support of quota validity time feature. |
| 8/4 | NORP | Sxa, Sxb, Sxc, N4 | UP function support of Number of Reports as specified in clause 5.2.2.2. |
| 8/5 | IPTV | N4 | UPF support of IPTV service (see clause 5.25) |

TABLE 1-continued

UP Function Features including DPD

| Feature Octet/ Bit | Feature | Interface | Description |
|---|---|---|---|
| 8/6 | IP6PL | N4 | UPF supports UE IPv6 address(es) allocation with IPv6 prefix length other than default/ 64 (including allocating/128 individual IPv6 addresses), as specified in clause 4.6.2.2 of of 3GPP TS 23.316 [57]. |
| 8/7 | TSCU | N4 | Time Sensitive Communication is supported by the UPF (see clause 5.26). |
| 8/8 | MPTCP | N4 | UPF support of MPTCP Proxy functionality (see clause 5.20) |
| 9/1 | ATSSS-LL | N4 | UPF support of ATSSS-LLL steering functionality (see clause 5.20) |
| 9/2 | QFQM | N4 | UPF support of per QoS flow per UE QoS monitoring (see clause 5.24.4). |
| 9/3 | GPQM | N4 | UPF support of per GTP-U Path QoS monitoring (see clause 5.24.5). |
| 9/4 | DPD | Sxb, Sxc, N4 | UPF acting as first MASQUE proxy for dual-proxy deployments is supported by the UP function. |

Feature Octet/Bit: The octet and bit number within the Supported-Features IE, e.g. "5/1".
Feature: A short name that can be used to refer to the octet/bit and to the feature.
Interface: A list of applicable interfaces to the feature.
Description: A clear textual description of the feature.

In step 3, a third party (e.g., a CDN provider) providing the second MASQUE (egress) Proxies for dual-proxy deployments provisions the second MASQUE proxy related information to MNO. It is proposed to define a new Nnef_DualProxy API, by AF triggering a Nnef_DualProxy request message towards NEF including the following information:

Second MASQUE proxy Provider ID: Identifies the provider of the second MASQUE Proxy in this dual-proxy deployment.

Second MASQUE Proxy address information. Includes the FQDNs and/or IP addresses of the second MASQUE proxies.

In steps 4 to 7, the NEF stores the above information in UDR (e.g., in a new data structure relative to dual-proxy deployment) and provides the information about the available dual proxy profiles by answering the request in Step 4 above with the Dual Proxy Profile information, including a list of:

Dual Proxy Profile Id, as the identifier of the profile.

Dual Proxy Profile Content, as the content related to the above identifier (e.g., a list of allowed domains)

The provisioning of the above information will allow subscription aware handling at the Second MASQUE Proxy.

In step 8, the UE triggers PDU session establishment, by means of sending a PDU Session Establishment Request to AMF including the SUPI and (optionally) an indication that dual proxy is enabled for this session.

In step 9, the AMF triggers Nsmf PDU Session Create message towards SMF.

In step 10, the SMF triggers a Npcf_SMPolicy Control_Create Request message towards PCF.

In step 11, the AMF triggers Npcf_AMPolicy Control_Create Request message to create the AM policy association for the user PDU session. This message includes the SUPI and (optionally) an indication that dual proxy is enabled for this session.

In step 12, the PCF triggers towards UDR a Nudr_Query request message to retrieve the policy data for this user's PDU session, by including the SUPI and (optionally) an indication that dual proxy is enabled for this session.

In step 13, the UDR answers including the subscriber's policy data for this user's PDU session, including the following information:

Second MASQUE Proxy address information. Includes the FQDNs and/or IP addresses of the CDN proxies. This is based on the information stored in Step 5.

Dual Proxy Profile Id. This allows subscription aware handling at the Second MASQUE Proxy.

Allowed policies. This includes which are the allowed policies (e.g., zero rating) for the traffic subject to dual proxy when requested by the UE.

In steps 14 and 15, the PCF generates the corresponding PCC rule/s (based on Subscriber Policy Data) by triggering a Npcf_SMPolicyControl_Create Response towards SMF including the following information:

Indication to enable MNO first MASQUE Proxy. This is an indication towards gateway (SMF/UPF) to enable MNO to provide the first MASQUE proxy for dual-proxy deployment.

A PCC rule for the traffic subject to dual-proxy connectivity including:

Second MASQUE Proxy address information. Includes the FQDNs or IP addresses of the Second MASQUE proxies. This is based on the information stored in Step 5 above.

Dual Proxy Profile Id. This allows subscription aware handling at the Second MASQUE Proxy.

Allowed policies. This includes which are the allowed policies (e.g., zero rating) for the traffic subject to dual proxy if requested by the UE.

In steps 16 and 17, the SMF selects a UPF supporting DPD capability (UPF acting as first MASQUE proxy in dual-proxy deployment) and triggers a PFCP Session Establishment Request message including the following information:

Indication to enable the MNO first MASQUE Proxy. This indicates UPF to enable the first MASQUE proxy in this dual-proxy deployment.

Dual Proxy Profile Id. This allows subscription aware handling at the Second MASQUE Proxy.

Second MASQUE Proxy address information. This will be used for validation at the first MASQUE Proxy.

PDR/FAR/QER/URR rules, particularly:

A PDR with PDI to detect dual proxy traffic. This will be used to match and authorize the traffic on dual-proxy connectivity.

Figure 4:
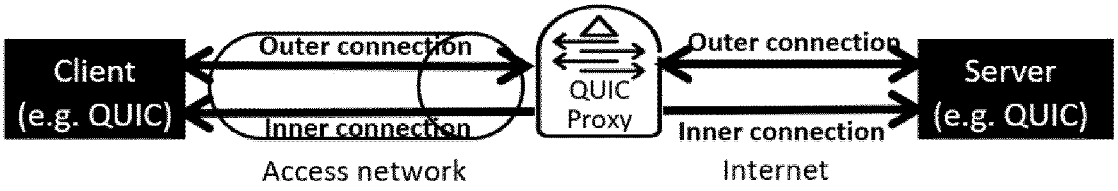
FIG. 4 illustrates an example block diagram showing network entities in a mobile communications network according to particular embodiments of the solution described herein.

An associated FAR/QER/URR to indicate the allowed policies. In the example sequence diagram of FIG. 4, the allowed policy is zero rating, so it is proposed to be included in the URR, which is extended to indicate UPF to allow zero rating policy (if requested by UE) and to report volume for the traffic on dual proxy.

In step 18, the UPF applies the following logic:

Retrieves from SMF (Step 17) the dual-proxy deployment rules (in this example a list of allowed policies). These rules are stored (and not activated) in the UPF.

Stores the Dual Proxy Profile Id.

Stores Second MASQUE Proxy address information.

Enables MNO Proxy acting as the first MASQUE proxy in the dual-proxy deployment.

Conveys MNO first MASQUE Proxy address information to UE (e.g., through SMF and NAS signaling).

In step 19, the UPF acknowledges the request by triggering a PFCP Session Establishment Response message towards SMF including the MNO first MASQUE Proxy address (e.g., IP address).

In steps 20 to 22, the SMF sends the MNO first MASQUE Proxy address towards UE. It is proposed to do it through NAS signaling by extending the ePCO field. Another alternative for UE to discover the first MASQUE Proxy is through DNS.

In step 23, the UE stores the received MNO first MASQUE Proxy address.

In step 24, in case the UE has not received the list of allowed policies for dual proxy deployment, UE might request them to the MNO (UPF) by connecting to the first MASQUE Proxy and triggering a request message.

In steps 25 and 26, the UPF (acting as First MASQUE Proxy) returns to UE the allowed policies for the Dual Proxy deployment.

In steps 27 and 28, the User (at UE) opens an application through dual-proxy deployment and requests zero rating policy to MNO. The UE sends a HTTP CONNECT method (or extended CONNECT) including the following information:

Protocol information, e.g., protocol=connect-udp.

Scheme information, e.g., scheme=https

Path information, e.g., path=/examplecdn.com/443/. This indicates the second proxy.

Authority information, e.g., authority=zerorate.examplemno.com. This indicates the requested policy (e.g., zero rating) to be applied by MNO.

Stream id information, e.g., streamId=0

In step 29, the UPF applies the following logic:

Detects traffic to (allowed) second MASQUE Proxy through MNO first MASQUE Proxy. The MNO will check whether this proxy belongs to a provider that has an agreement with the MNO for the dual-proxy deployment.

Authorizes the requested policy (e.g., zero rating) based on the dual-proxy deployment rules stored in Step 17.

Reports detected traffic (e.g., volume reporting to SMF) that will be zero rated by MNO.

In step 30, the UPF (MNO first MASQUE Proxy) answers the message in step 25 above including the DualProxyProfileId (received in Step 17) which can optionally be encrypted and indicating successful operation.

In step 31, the UE triggers towards the MNO first MASQUE Proxy a REGISTER DATAGRAM message indicating the stream-Id.

In step 32, through the tunnel of the first MASQUE proxy connection, the client performs a CONNECT request to the second proxy, i.e., UE sends a HTTP CONNECT method including the following information:

Protocol information, e.g., protocol=connect-udp.

Schema information, e.g., scheme=https

Path information, e.g., path=/video.example.com/443/. This indicates the target host (application server).

Authority information, e.g., authority=examplecdn.com. This indicates the domain of the second proxy.

Profile Id information, e.g., profile=DualProxyProfileId. This allows subscription aware handling at the Second MASQUE Proxy.

Stream Id information, e.g., streamId=0.

In steps 33 and 34, the UPF detects traffic as traffic subject to dual proxy, handles in first MASQUE proxy and forwards to second MASQUE proxy. Note the target domain (video.example.com) is not visible to UPF so the user privacy provided by the dual-proxy deployment is respected.

In steps 35 and 36, the second MASQUE Proxy receives the CONNECT message and authorizes it by matching the path (e.g., video.example.com) with the allowed domains. A generic (for all sessions) list of allowed domains can be pre-provisioned at the Second MASQUE Proxy. The set of allowed domains is decided with the MNO based on the SLA agreement. Additionally, DualProxyProfileId (and the corresponding DualProxyProfileContent, received in Step 7 above) allows subscription aware handling at the Second MASQUE Proxy (e.g., in case DualProxyProfileContent includes a list of allowed domains that are to be applied for that particular session). Once authorized, Second MASQUE Proxy resolves the domain in the path header to identify the target application server and returns a status 200.

In step 37, the UE triggers towards the second MASQUE Proxy a REGISTER DATAGRAM message indicating the stream-Id.

In step 38, the UE sends HTTP3 datagrams towards the Application Server. End-to-end data is relayed via the first MASQUE proxy to the second MASQUE proxy and onwards to the target server. The MNO is unaware of the target application, the provider of the second MASQUE proxy and target server are unaware of the subscriber address.

In step 39, the UPF reports detected traffic (e.g., volume) based on the URR (installed in Step 17 above). Not shown in the figure, but this traffic will be reported by UPF to SMF (in a PFCP Session Report Request message). SMF will generate e.g., offline CDR, so this traffic will be zero rated. Note the target application (video.example.com) is not visible to MNO (UPF) so the user privacy provided by the dual-proxy deployment is respected.

Finally, the solution described in this IvD does not only apply to 5G network architecture, but the same mechanisms can be applied to 4G, by replacing:

NEF by SCEF

PCF by PCRF

UDR by SPR

AMF by MME

SMF by PGW-C or TDF-C

UPF by PGW-U or TDF-U

Hereinafter, flowcharts showing examples of embodiments of the solution are described in detail.

The embodiments correspond to methods performed by and involving a first proxy node (103, 800), a session management node (107), a network exposure node (109, 1000), a policy control node (111), a second proxy node (113, 900), a user data repository node (114).

Figure 5:
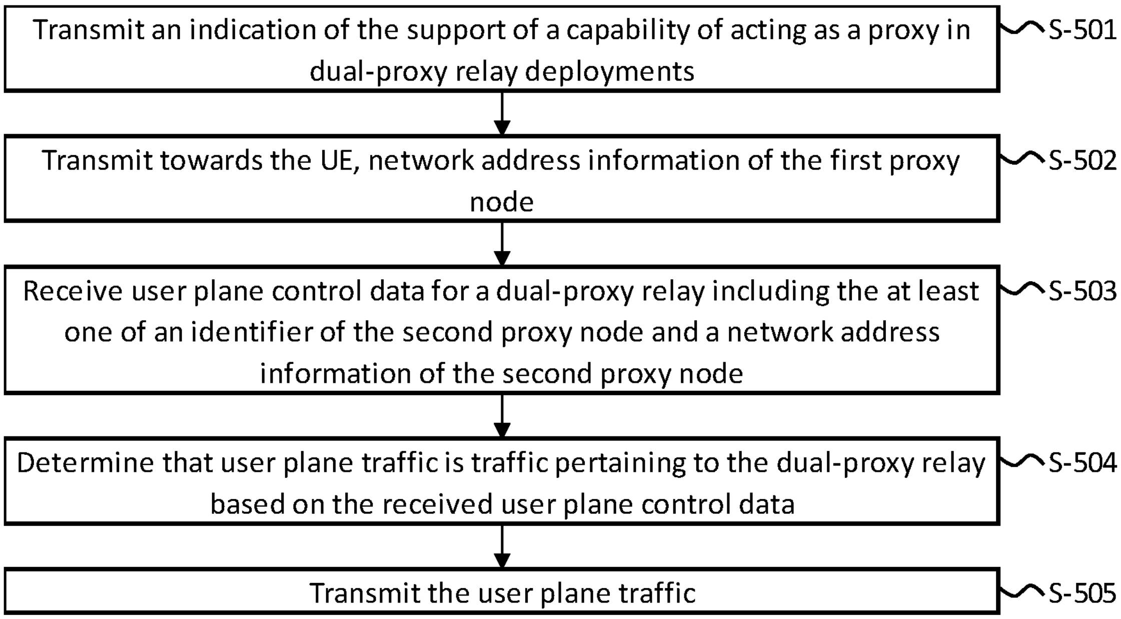
FIG. 5 illustrates an example flowchart showing a method performed by a mobile network node according to particular embodiments of the solution described herein.

FIG. 5 is a flowchart illustrating a method performed by the first proxy node for enabling dual-proxy relays in a communications network.

In step S-501, the first proxy node transmits to the session management node an indication of the support of the capability of acting as a proxy in dual-proxy relay deployments.

In step S-502, the first proxy node transmits towards the UE, network address information of the first proxy node.

In step S-503, the first proxy node receives from a session management node user plane control data for a dual-proxy relay including the at least one of an identifier of the second proxy node and a network address information of the second proxy node.

In step S-504, the first proxy node determines that user plane traffic is traffic pertaining to the dual-proxy relay based on the received user plane control data.

In step S-505, the first proxy node transmits to the second proxy node the user plane traffic.

In some embodiments, the network address information of the first proxy node is transmitted via the session management node, particularly wherein the network address information of the first proxy node is further transmitted via Extended Protocol Configuration Options (ePCO).

In some embodiments, determining that the user plane traffic is traffic pertaining to the dual-proxy relay comprises determining that a connection has been established between the first proxy node and the UE.

In some embodiments, the connection is a MASQUE connection.

In some embodiments, the user plane control data further includes a dual-proxy profile identifier, and wherein the first proxy node transmits the dual-proxy profile identifier to the second proxy node included in the user plane data.

In some embodiments, the user plane control data further includes an indication to enable the dual-proxy relay, and wherein the first proxy node activates the dual-proxy relay functionality based on the indication.

In some embodiments, the user plane control data further includes at least one of an allowed policy for the dual-proxy relay and/or a policy rule for the dual-proxy relay, and wherein the first proxy node performs the corresponding policy actions based on the at least one allowed policy and/or the policy rule.

In some embodiments, the first proxy node and second proxy node are MASQUE proxy nodes.

In some embodiments, the first proxy node is a User Plane Function (UPF), or a combination of a UPF and a proxy service function; the second proxy node is an Application Function (AF), and the session management node is a Session Management Function (SMF).

Figure 6:
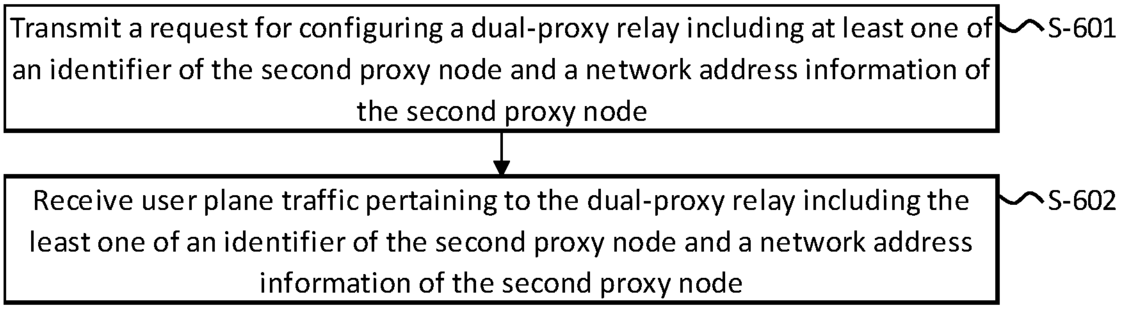
FIG. 6 illustrates an example flowchart showing a method performed by a mobile network node according to particular embodiments of the solution described herein.

FIG. 6 is a flowchart illustrating a method performed by the second proxy node for enabling dual-proxy relays in a communications network.

In step S-601, the second proxy node transmits to a network exposure node a request for configuring a dual-proxy relay including at least one of an identifier of the second proxy node and a network address information of the second proxy node.

In step S-602, the second proxy node receives from a first proxy node user plane traffic pertaining to the dual-proxy relay including the least one of an identifier of the second proxy node and a network address information of the second proxy node.

In some embodiments, the request for configuring the dual-proxy relay further includes a dual-proxy profile identifier, and wherein the second proxy node receives the dual-proxy profile identifier from the first proxy node included in the user plane traffic.

In some embodiments, the request for configuring the dual-proxy relay further includes an indication to enable the dual-proxy relay, and wherein the second proxy node receives the user plane traffic after the enabling of the dual-proxy relay.

In some embodiments, the request for configuring the dual-proxy relay further includes at least one of an allowed policy for the dual-proxy relay and/or a policy rule for the dual-proxy relay, and wherein the second proxy node receives the user plane traffic according to the at least one allowed policy and/or the policy rule.

In some embodiments, the first proxy node and second proxy node are MASQUE proxy nodes.

In some embodiments, the first proxy node is a User Plane Function (UPF), or a combination of a UPF and a proxy service function; the second proxy node is an Application Function (AF), and the network exposure node is a Network Exposure Function (NEF).

Figure 7:
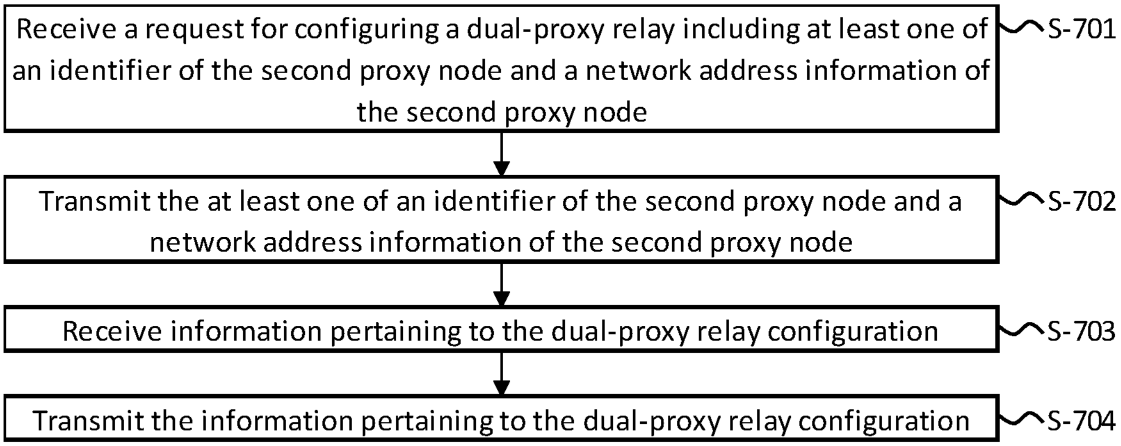
FIG. 7 illustrates an example flowchart showing a method performed by a mobile network node according to particular embodiments of the solution described herein.

FIG. 7 is a flowchart illustrating a method performed by the network exposure node for enabling dual-proxy relays in a communications network.

In step S-701, the network exposure node receives from a second proxy node a request for configuring a dual-proxy relay including at least one of an identifier of the second proxy node and a network address information of the second proxy node.

In step S-702, the network exposure node transmits to a user data repository node the at least one of an identifier of the second proxy node and a network address information of the second proxy node.

In step S-703, the network exposure node receives from the user data repository node information pertaining to the dual-proxy relay configuration, particularly wherein the information includes at least one of an indication of success or an indication of failure.

In step S-704, the network exposure node transmits to the second proxy node the information pertaining to the dual-proxy relay configuration.

In some embodiments, the information pertaining to the dual-proxy relay configuration further includes a dual-proxy profile identifier.

In some embodiments, the request for configuring the dual-proxy relay further includes an indication to enable the dual-proxy relay.

In some embodiments, the request for configuring the dual-proxy relay further includes at least one of an allowed policy for the dual-proxy relay and/or a policy rule for the dual-proxy relay.

In some embodiments, the second proxy node is a MASQUE proxy node.

In some embodiments, the second proxy node is an Application Function (AF), the network exposure node is a Network Exposure Function (NEF) and the user data repository node is a User Data Repository (UDR).

Figure 8:
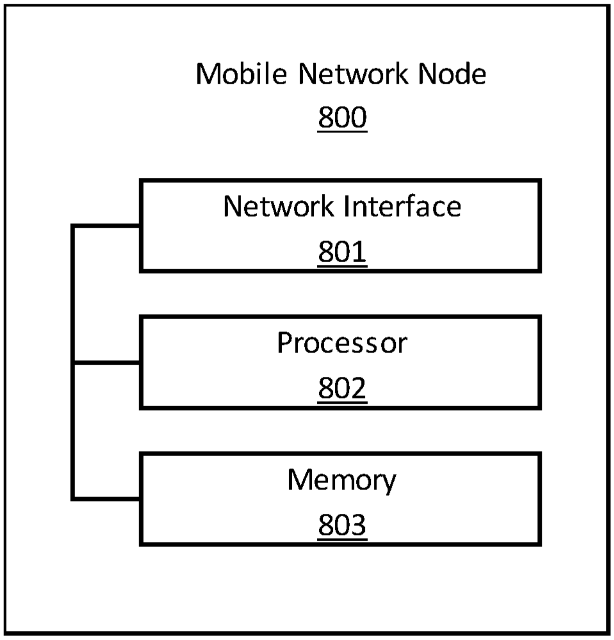
FIG. 8 illustrates an example block diagram of a mobile network node configured in accordance with particular embodiments of the solution described herein.

FIG. 8 is a block diagram illustrating elements of a mobile network node 800 of a mobile communications network. In some embodiments, the mobile network node 800 is a UPF 103. As shown, the mobile network node may include network interface circuitry 801 (also referred to as a network interface) configured to provide communications with other nodes of the core network and/or the network. The mobile network node may also include a processing circuitry 802 (also referred to as a processor) coupled to the network interface circuitry, and memory circuitry 803 (also referred to as memory) coupled to the processing circuitry. The memory circuitry 803 may include computer readable program code that when executed by the processing circuitry 802 causes the processing circuitry to perform operations according to embodiments disclosed herein. According to other embodiments, processing circuitry 802 may be defined to include memory so that a separate memory circuitry is not required. As discussed herein, operations of the mobile network node may be performed by processing circuitry 802 and/or network interface circuitry 801. For example, processing circuitry 802 may control network interface circuitry 801 to transmit communications through network interface circuitry 801 to one or more other network nodes and/or to receive communications through network interface circuitry from one or more other network nodes. Moreover, modules may be stored in memory 803, and these modules may provide instructions so that when instructions of a module are executed by processing circuitry 802, processing circuitry 802 performs respective operations (e.g., operations discussed below with respect to Example Embodiments relating to core network nodes).

Figure 9:
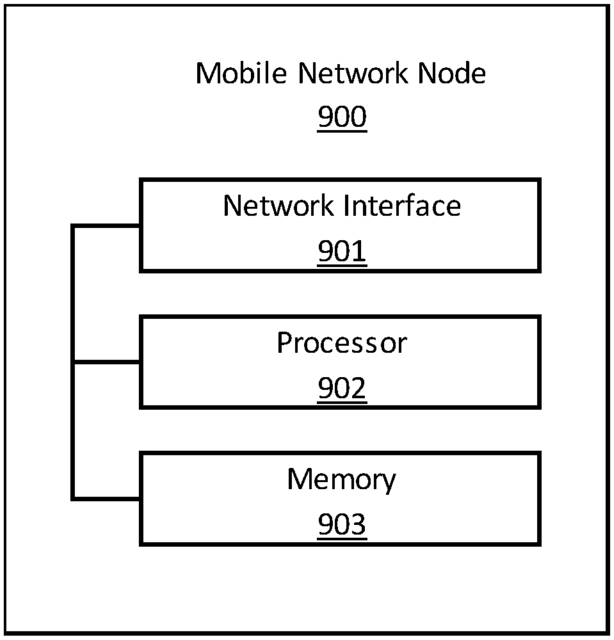
FIG. 9 illustrates an example block diagram of a mobile network node configured in accordance with particular embodiments of the solution described herein.

FIG. 9 is a block diagram illustrating elements of a mobile network node 900 of a mobile communications network. In some embodiments, the mobile network node 900 is an AF 113. As shown, the mobile network node may include network interface circuitry 901 (also referred to as a network interface) configured to provide communications with other nodes of the core network and/or the network. The mobile network node may also include a processing circuitry 902 (also referred to as a processor) coupled to the network interface circuitry, and memory circuitry 903 (also referred to as memory) coupled to the processing circuitry. The memory circuitry 903 may include computer readable program code that when executed by the processing circuitry 902 causes the processing circuitry to perform operations according to embodiments disclosed herein. According to other embodiments, processing circuitry 902 may be defined to include memory so that a separate memory circuitry is not required. As discussed herein, operations of the mobile network node may be performed by processing circuitry 902 and/or network interface circuitry 901. For example, processing circuitry 902 may control network interface circuitry 901 to transmit communications through network interface circuitry 901 to one or more other network nodes and/or to receive communications through network interface circuitry from one or more other network nodes. Moreover, modules may be stored in memory 903, and these modules may provide instructions so that when instructions of a module are executed by processing circuitry 902, processing circuitry 902 performs respective operations (e.g., operations discussed below with respect to Example Embodiments relating to core network nodes).

Figure 10:
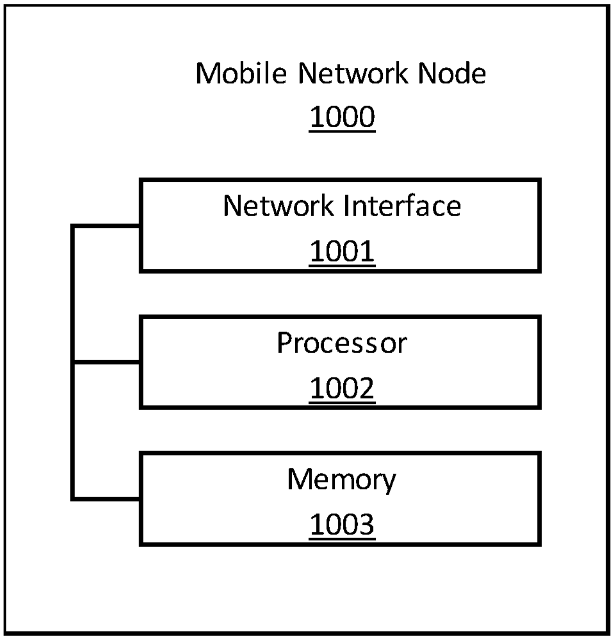
FIG. 10 illustrates an example block diagram of a mobile network node configured in accordance with particular embodiments of the solution described herein.

FIG. 10 is a block diagram illustrating elements of a mobile network node 1000 of a mobile communications network. In some embodiments, the mobile network node 1000 is a NEF 109. As shown, the mobile network node may include network interface circuitry 1001 (also referred to as a network interface) configured to provide communications with other nodes of the core network and/or the network. The mobile network node may also include a processing circuitry 1002 (also referred to as a processor) coupled to the network interface circuitry, and memory circuitry 1003 (also referred to as memory) coupled to the processing circuitry. The memory circuitry 1003 may include computer readable program code that when executed by the processing circuitry 1002 causes the processing circuitry to perform operations according to embodiments disclosed herein. According to other embodiments, processing circuitry 1002 may be defined to include memory so that a separate memory circuitry is not required. As discussed herein, operations of the mobile network node may be performed by processing circuitry 1002 and/or network interface circuitry 1001. For example, processing circuitry 1002 may control network interface circuitry 1001 to transmit communications through network interface circuitry 1001 to one or more other network nodes and/or to receive communications through network interface circuitry from one or more other network nodes. Moreover, modules may be stored in memory 1003, and these modules may provide instructions so that when instructions of a module are executed by processing circuitry 1002, processing circuitry 1002 performs respective operations (e.g., operations discussed below with respect to Example Embodiments relating to core network nodes).

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such tangible computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the tangible computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures that perform particular tasks or implement particular abstract data types. Computer executable instructions, associated data structures, and program modules represent examples of the program code means for executing steps of the methods disclosed herein. The particular sequence of such executable instructions or associated data structures represent examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Communication at various stages of the described system can be performed through a local area network, a token ring network, the Internet, a corporate intranet, 802.11 series wireless signals, fiber-optic network, radio or microwave transmission, etc. Although the underlying communication technology may change, the fundamental principles described herein are still applicable.

The various embodiments described above are provided by way of illustration only and should not be construed to limit the invention. For example, the principles herein may be applied to any remotely controlled device. Further, those of skill in the art will recognize that communication between the remote the remotely controlled device need not be limited to communication over a local area network but can include communication over infrared channels, Bluetooth or any other suitable communication interface. Those skilled in the art will readily recognize various modifications and changes that may be made to the present invention without following the example embodiments and applications illustrated and described herein, and without departing from the scope of the present disclosure.

The terminology used herein is for the purpose of describing various embodiments only and is not intended to be limiting of example embodiments. As used herein, the singular forms "a," "an," and "the" are intended to include the plural forms as well, unless the context clearly indicates otherwise. It will be further understood that the terms "includes," "including," "comprises," and "comprising," when used in this specification, specify the presence of stated features, integers, steps, operations, elements, or components, and combinations thereof, but do not preclude the presence or addition of one or more other features, integers, steps, operations, elements, or components, and combinations thereof. Further, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

The invention claimed is:

1. A method for enabling dual-proxy relays in a communications network, the method comprising:

transmitting from a second proxy node to a network exposure node a request for configuring a dual-proxy relay including at least one of an identifier of the second proxy node and a network address information of the second proxy node;

transmitting from the network exposure node to a user data repository node the at least one of an identifier of the second proxy node and a network address information of the second proxy node;

receiving at a policy control node from the user data repository node subscription data for the dual-proxy relay including the at least one of an identifier of the second proxy node and a network address information of the second proxy node;

transmitting from the policy control node to a session management node policy data for the dual-proxy relay including the at least one of an identifier of the second proxy node and a network address information of the second proxy node;

transmitting from the session management node to a first proxy node user plane control data for the dual-proxy relay including the at least one of an identifier of the second proxy node and a network address information of the second proxy node;

determining at the first proxy node that user plane traffic is traffic pertaining to the dual-proxy relay based on the received user plane control data; and transmitting from the first proxy node to the second proxy node the user plane traffic.

2. The method of claim 1, further comprising:

transmitting from the first proxy node to the session management node an indication of the support of the capability of acting as a proxy in dual-proxy relay deployments; and selecting at the session management node the first proxy node based on the transmitted indication.

3. The method of claim 1, further comprising:

receiving at the policy control node an indication originated in a User Equipment, UE, that the UE is dual-proxy enabled; and initiating at the policy control node the retrieval of the subscription data for the dual-proxy relay for the UE.

4. The method of claim 1, further comprising:

transmitting from the first proxy node towards the UE, network address information of the first proxy node.

5. The method of claim 4, wherein the network address information of the first proxy node is transmitted via the session management node, wherein the network address information of the first proxy node is further transmitted via Extended Protocol Configuration Options, ePCO.

6. The method of claim 1, wherein determining that the user plane traffic is traffic pertaining to the dual-proxy relay comprises determining that a connection has been established between the first proxy node and the UE.

7. The method of claim 6, wherein the connection is a MASQUE connection.

8. The method of claim 1, wherein one or more of the subscription data, the policy data, and the user plane control data further include a dual-proxy profile identifier, and wherein the first proxy node transmits the dual-proxy profile identifier to the second proxy node included in the user plane traffic.

9. The method of claim 1, wherein one or more of the subscription data, the policy data, and the user plane control data further include an indication to enable the dual-proxy relay, and wherein the first proxy node activates the dual-proxy relay functionality based on the indication.

10. The method of claim 1, wherein one or more of the subscription data, the policy data, and the user plane control data further include one or both of:

at least one allowed policy for the dual-proxy relay and at least one policy rule for the dual-proxy relay, and wherein the first proxy node performs the corresponding policy actions based on the one of both of the at least one allowed policy and the at least one policy rule.

11. The method of claim 1, wherein the first proxy node is a User Plane Function, UPF, or a combination of a UPF and a proxy service function; the second proxy node is an Application Function, AF, the session management node is a Session Management Function, SMF, the policy control node is a Policy Control Function, PCF, the network exposure node is a Network Exposure Function, NEF, and the user data repository node is a User Data Repository, UDR.

* * * * *